(12) United States Patent
Zhang et al.

(10) Patent No.: US 9,252,999 B1
(45) Date of Patent: Feb. 2, 2016

(54) METHOD AND APPARATUS FOR PERFORMING CHANNEL ESTIMATION AND EQUALIZATION BASED ON A SIGNAL FIELD OF A RECEIVED PACKET

(71) Applicant: Marvell International LTD., Hamilton (BM)

(72) Inventors: Hongyuan Zhang, Fremont, CA (US); Xiayu Zheng, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/499,953

(22) Filed: Sep. 29, 2014

Related U.S. Application Data (60) Provisional application No. 61/888,176, filed on Oct. 8, 2013.

(51) Int. Cl.
*H04K 1/10* (2006.01)
*H04L 27/01* (2006.01)
*H04L 25/02* (2006.01)

(52) U.S. Cl.
CPC ............ *H04L 27/01* (2013.01); *H04L 25/0202* (2013.01)

(58) Field of Classification Search
None
See application file for complete search history.

(56) References Cited

U.S. PATENT DOCUMENTS

2006/0159196 A1* 7/2006 Kwun et al. ................. 375/267
2011/0194475 A1* 8/2011 Kim et al. .................... 370/311

OTHER PUBLICATIONS

Multi-Rate Layered Decoder Architeture for Block LDPC Codes of the IEEE 802.11n Wireless Standard, 2007.
IEEE P802.11ac/D2.1; Part 11: Wireless LAN Medium Access Control (MAC) and Physical Layer (PHY) Specifications/Amendment 4: Enhancements for Very High Throughput for Opertaion in bands below 6 GHz, Mar. 2012.
IEEE Std. 802.11a-1999; Part 11:Wireless LAN Medium Access Control (MAC) and Physical Layer (PHY) Specifications/High Speed Physical Layer in the 5 GHz Band, 1999.
IEEE Std. 802.11-2012; Part 11: Part 11:Wireless LAN Medium Access Control (MAC) and Physical Layer (PHY) Specifications, 2012.

* cited by examiner

*Primary Examiner* — Adolf Dsouza (57) ABSTRACT

A network device including a receiver module, a first channel estimate module, and a frequency equalizer. The receiver module is configured to receive a packet wirelessly transmitted over a channel to the network device, where the packet comprises a signal field, and where the signal field (i) comprises bits, or (ii) has corresponding sub-carriers. The first channel estimate module is configured to, (i) based on the signal field, perform multiple determinations, where each of the determinations indicates whether a respective one of the bits or a respective one of the sub-carriers has been modulated with a first predetermined value or a second predetermined value, and (ii) based on the determinations, output a first estimate of the channel. The frequency equalizer is configured to (i) receive a first signal including the packet, and (ii) equalize the first signal based on the first channel estimate.

21 Claims, 10 Drawing Sheets

METHOD AND APPARATUS FOR PERFORMING CHANNEL ESTIMATION AND EQUALIZATION BASED ON A SIGNAL FIELD OF A RECEIVED PACKET

CROSS-REFERENCE TO RELATED APPLICATIONS

This application claims the benefit of U.S. Provisional Application No. 61/888,176, filed on Oct. 8, 2013. The entire disclosure of the application referenced above is incorporated herein by reference.

FIELD

The present disclosure relates to wireless local area networks, and more particularly to channel estimation.

BACKGROUND

Orthogonal frequency division multiplexing (OFDM) is employed in wireless communication systems for transmission of data between network devices in wireless local area networks. Channel estimation is typically performed at receivers to account for frequency selective fading and time varying factors (e.g., delay) due to wireless transmission over a channel.

Figure 1:
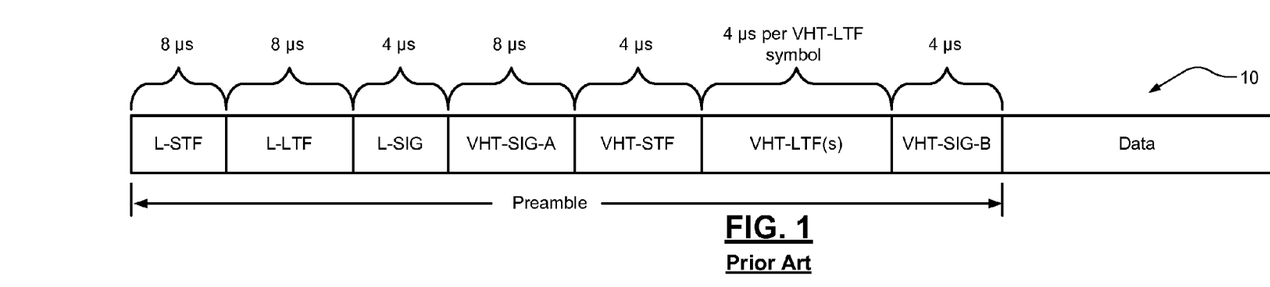
FIG. 1 is a block diagram of a physical layer convergence protocol (PLCP) data unit (PPDU) format.

Institute of Electrical and Electronics Engineers (IEEE) 802.11ac is a wireless networking standard that is marketed under the brand name Wi-Fi® and is directed to high-throughput wireless local area networks (WLAN5). IEEE 802.11ac provides a physical layer convergence protocol (PLCP) data unit (PPDU) format that includes a preamble and data. The preamble and data are transmitted as OFDM symbols. The PPDU format 10 is shown in FIG. 1. The preamble includes (i) legacy fields applicable to IEEE 802.11a and IEEE 802.11n, and (ii) fields specific to IEEE 802.11ac. The legacy fields include a legacy short training field (L-STF), a legacy long training filed (L-LTF), and a legacy signal field (L-SIG). The fields specific to IEEE 802.11ac include a first very high throughput signal (VHT-SIG-A) field, a very high throughput short training field (VHT-STF), one or more very high throughput long training fields (VHT-LTFs), and a second very high throughput signal (VHT-SIG-B) field. The L-STF, L-LTF, L-SIG, VHT-SIG-A, VHT-STF, VHT-LTFs, and VHT-SIG-B fields have respective time durations, as shown in FIG. 1.

The legacy fields are used for backward compatibility with network devices operating according to IEEE 802.11a and/or IEEE 802.11n standards. The L-STF is used for start of packet detection, automatic gain control, initial frequency offset estimation, and initial time synchronization. The L-LTF is used for fine frequency offset estimation, time synchronization, and channel estimation. The L-SIG field is used for determining data rate and length information and time to remain "off air".

The VHT-SIG-A field identifies: whether packets are IEEE 802.11n or IEEE 802.11ac packets; a bandwidth; a number of data streams; a guard interval; a type of coding; a modulation and coding scheme (MCS); and whether packets are beamforming packets. The VHT-STF is used to improve automatic gain control for multiple-input-multiple-output (MIMO) network devices. One or more VHT-LTFs are included in the PPDU depending on a number of data streams and/or users (network devices) in the corresponding WLAN. Each of the VHT-LTFs is a single symbol in length and has a long training sequence that is used for channel estimation. Data tones of each VHT-LTF symbol are multiplied by entries belonging to a matrix $P_{VHTLTF}$ to estimate the channel (e.g., a MIMO channel). The matrix $P_{VHTLTF}$ is defined in IEEE 802.11n and IEEE802.11ac. At a transmitter, the VHT-LTFs are modulated and tone mapped using a first column of the matrix $P_{VHTLTF}$. A receiver receives the VHT-LTFs and performs channel estimation based on the matrix $P_{VHTLTF}$.

Figure 2:
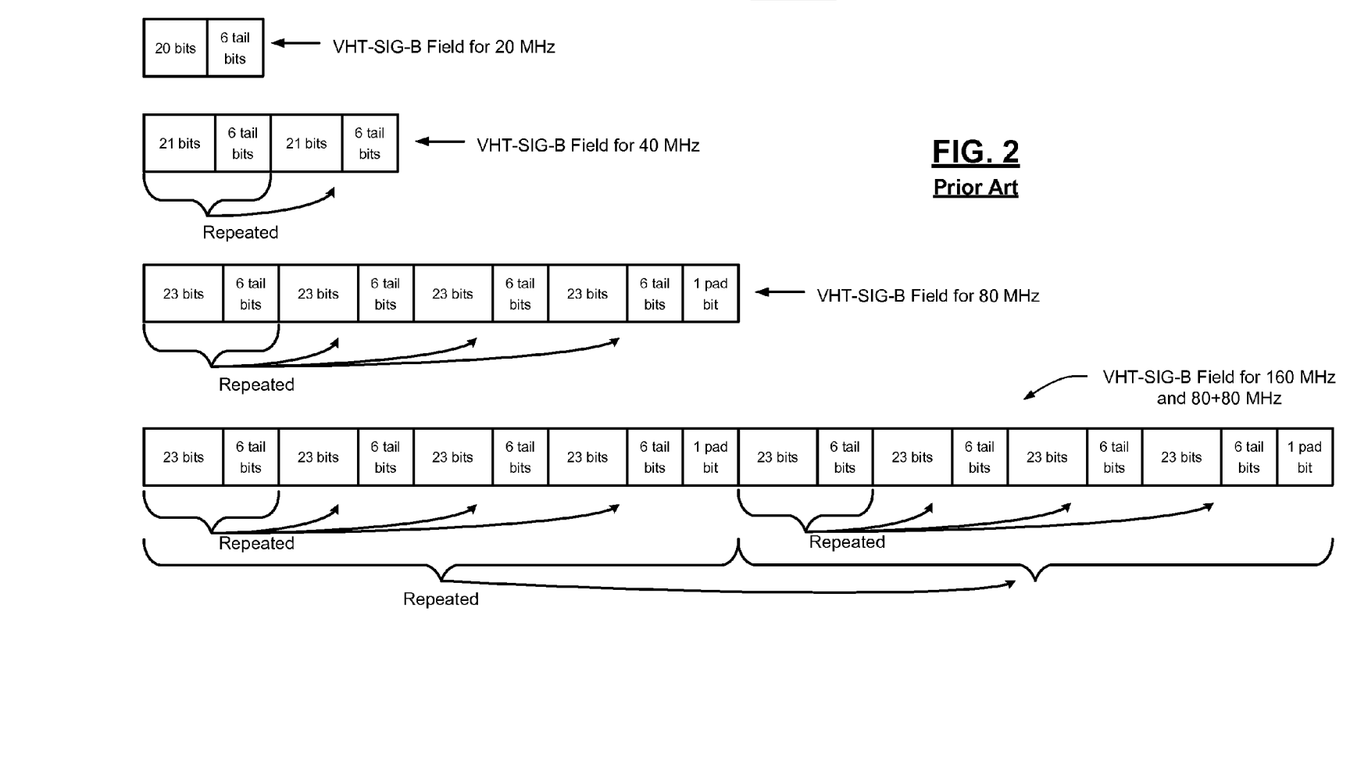
FIG. 2 is a block diagram illustrating VHT-SIG-B formats for respective bandwidths.

The VHT-SIG-B field is a single symbol in length and provides user specific information including data length and MCS information. The VHT-SIG-B field is primarily used for multiple user (MU) applications and is typically ignored for single user (SU) applications. The VHT-SIG-B field may include a predetermined number of length bits and a predetermined number of tail bits. Depending on a bandwidth (e.g., 20 mega-hertz (MHz), 40 MHz, 80 MHz, 160 MHz or non-contiguous 160 MHz (referred to as 80+80 MHz)) allocated for transmission of the VHT-SIG-B field, the length bits and the tail bits may be repeated a predetermined number of times. FIG. 2 shows examples of the VHT-SIG-B field for the 20 MHz, 40 MHz, 80 MHz, 160 MHz and 80+80 MHz bandwidths. The symbol size of the VHT-SIG-B field changes depending on the bandwidth to include the repeated bits. The time duration associated with transmission of the VHT-SIG-B field is the same remains constant (e.g., 4 microseconds ($\mu s$)) for the different bandwidths.

SUMMARY

A network device is provided and includes a receiver module, a first channel estimate module, and a frequency equalizer. The receiver module is configured to receive a packet wirelessly transmitted over a channel to the network device, where the packet comprises a signal field, and where the signal field (i) comprises bits, or (ii) has corresponding sub-carriers. The first channel estimate module is configured to, (i) based on the signal field, perform multiple determinations, where each of the determinations indicates whether a respective one of the bits or a respective one of the sub-carriers has been modulated with a first predetermined value or a second predetermined value, and (ii) based on the determinations, output a first estimate of the channel. The frequency equalizer is configured to (i) receive a first signal including the packet, and (ii) equalize the first signal based on the first channel estimate.

In other features, a method is provided and includes: receiving a packet wirelessly transmitted over a channel at a network device, where the packet includes a signal field, and where the signal field (i) includes bits, and (ii) has corresponding sub-carriers; and based on the signal field, performing multiple determinations, where each of the determinations indicates whether a respective one of the bits or a respective one of the sub-carriers has been modulated with a first predetermined value or a second predetermined value, and (ii) based on the determinations, output a first estimate of the channel. The method further includes: receiving a first signal including the packet at a frequency equalizer; and equalizing, via the frequency equalizer, the first signal based on the first estimate of the channel.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

WLAN devices operating according to the IEEE 802.11ac standard perform channel estimation based on VHT-LTFs of PPDUs. To improve channel estimation, examples are disclosed below, which include performing channel estimation based on VHT-SIG-B fields of PPDUs (hereinafter referred to as packets).

Figure 3:
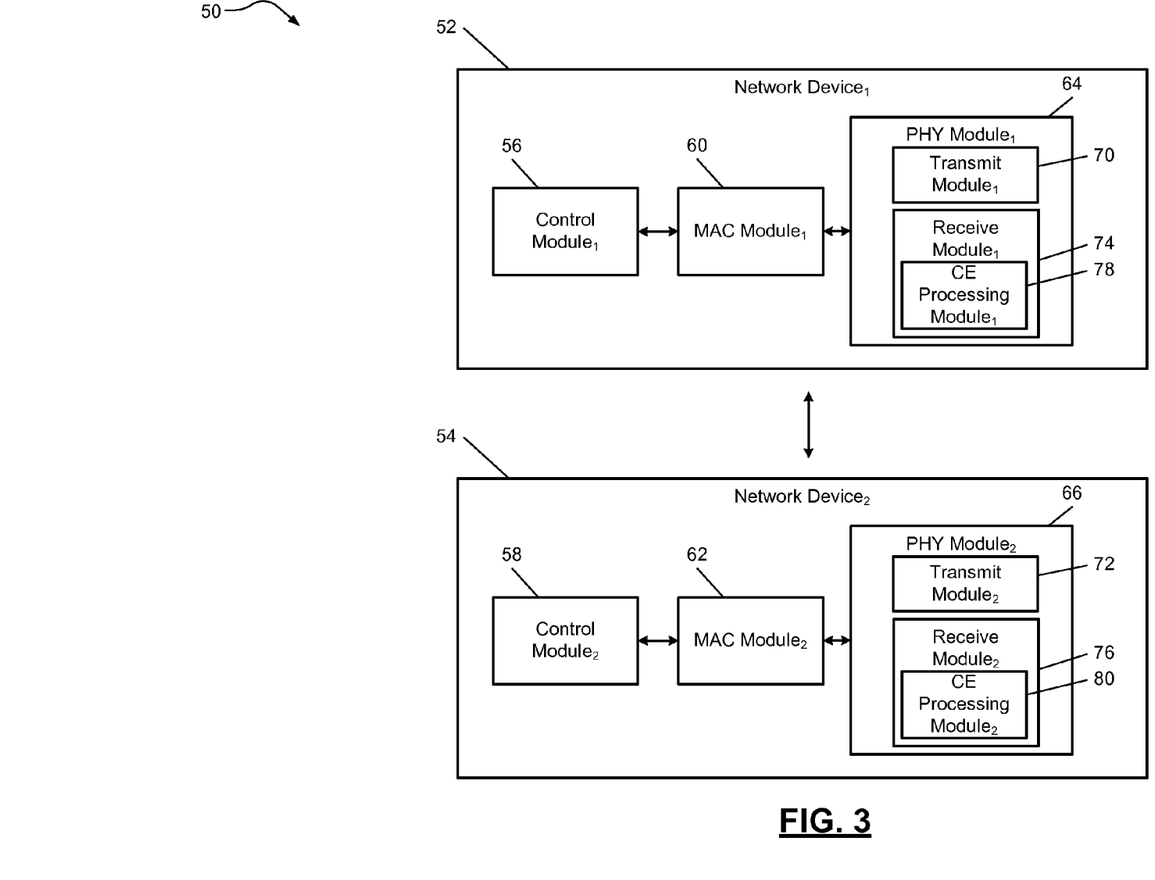
FIG. 3 is a functional block diagram of a wireless local area network including network devices with respective channel estimation processing modules in accordance with an embodiment of the present disclosure.

FIG. 3 shows a wireless local area network (WLAN) 50 that includes network devices 52, 54, which may operate according to the IEEE 802.11ac standard. Although two network devices are shown, any number of network devices may be included in the WLAN. Either of the network devices 52, 54 may be an access point and transfer data between the other network devices. The network devices 52, 54 may be mobile devices, computers, cellular phones, etc. The network devices 52, 54 include respective control modules 56, 58, medium access control (MAC) modules 60, 62, and physical layer (PHY) modules 64, 66. The PHY modules 64, 66 include respective transmit modules 70, 72 and receive modules 74, 76. The transmit modules 70, 72 and the receive modules 74, 76 may include and/or be implemented as respective transmitters and receivers. The control modules 56, 58 transmit and receive data to and from the MAC modules 60, 62. The MAC modules 60, 62 receive and transmit data to and from the PHY modules 64, 66. The PHY modules 64, 66 transmit data in the form of OFDM symbols to and from each other via the transmit modules 70, 72 and the receive modules 74, 76.

The transmit modules 70, 72 modulate and tone map VHT-LTFs and VHT-SIG-B fields based on, for example, a first column of a matrix $P_{VHTLTF}$. The matrix $P_{VHTLTF}$ is defined in IEEE 802.11n and IEEE802.11ac. An example of the matrix $P_{VHTLTF}$ is shown below as equation 1, where an examples of the matrices $P_{4\times4}$, $P_{6\times6}$, $P_{8\times8}$ are shown respectively in equations 2 and $N_{STS,total}$ is a total number of space-time streams.

$$P_{VHTLTF} = \begin{cases} P_{4x4}, N_{STS,total} \leq 4 \\ P_{6x6}, N_{STS,total} \leq 5, 6 \\ P_{8x8}, N_{STS,total} \leq 7, 8 \end{cases} \quad [1]$$

$$P_{6x6} = \begin{bmatrix} 1 & -1 & 1 & 1 & 1 & -1 \\ 1 & -w^1 & w^2 & w^3 & w^4 & -w^5 \\ 1 & -w^2 & w^4 & w^6 & w^8 & -w^{10} \\ 1 & -w^3 & w^6 & w^9 & w^{12} & -w^{15} \\ 1 & -w^4 & w^8 & w^{12} & w^{16} & -w^{20} \\ 1 & -w^5 & w^{10} & w^{15} & w^{20} & -w^{25} \end{bmatrix} \quad [2]$$

$$P_{8x8} = \begin{bmatrix} P_{4x4} & P_{4x4} \\ P_{4x4} & -P_{4x4} \end{bmatrix} \quad [3]$$

The receive modules 74, 76 include respective channel estimation (CE) processing modules 78, 80, which perform channel estimations based on the VHT-LTFs and/or VHT-SIG-B fields of received packets. Frequency equalization and decoding is then performed based on the channel estimations.

Figure 4:
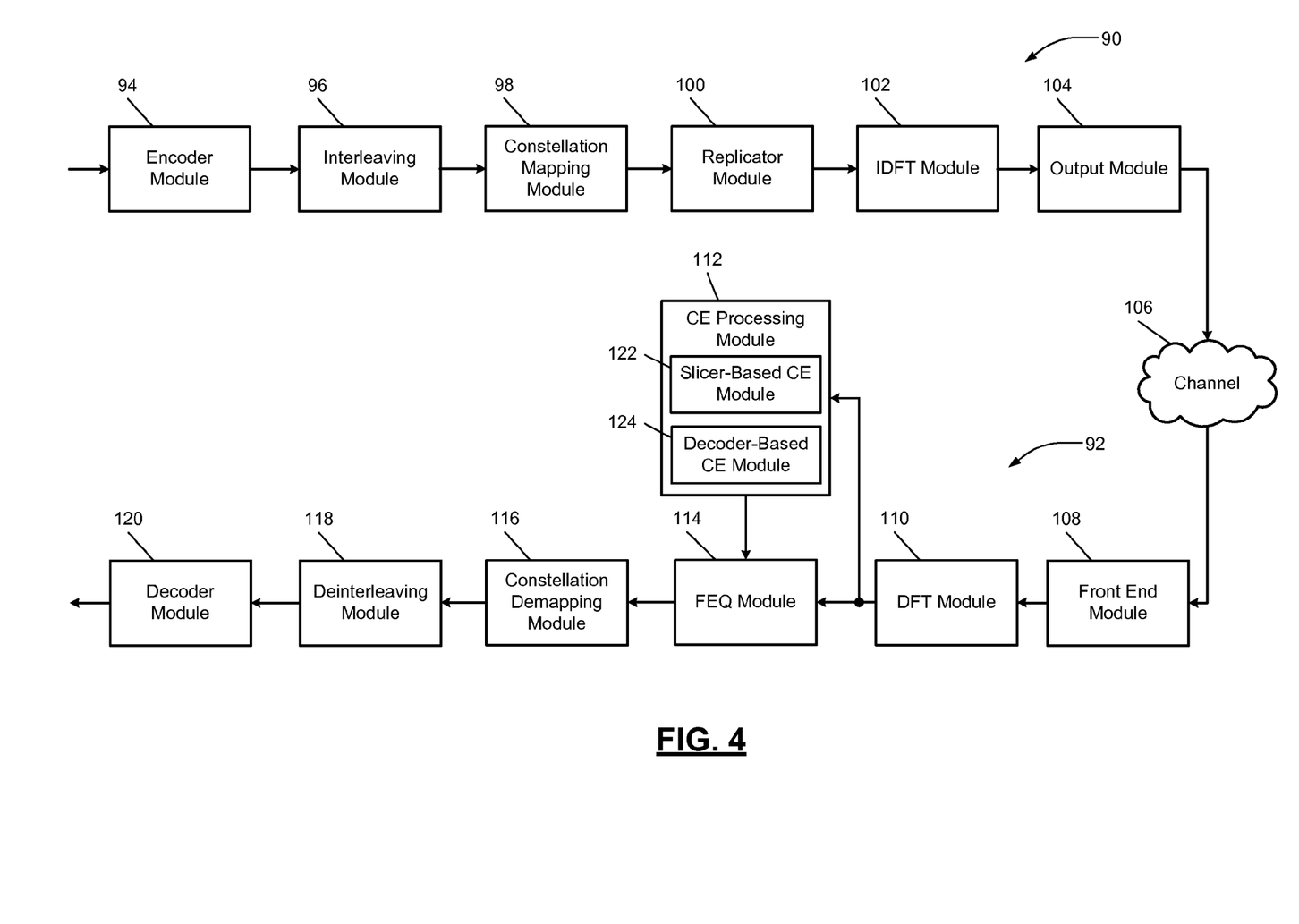
FIG. 4 is a functional block diagram illustrating portions of a transceiver module and a receiver module in accordance with an embodiment of the present disclosure.

FIG. 4 shows a portion 90 of a transmit module (e.g., one of the transmit modules 70, 72 of FIG. 1) and a portion 92 of a receive module (e.g., one of the receive modules 74, 76 of FIG. 1). The portion 90 of the transmit module includes an encoder module 94, an interleaving module 96, a constellation mapping module 98, a replicator module 100, an inverse discrete Fourier transform (IDFT) module 102 and an output module 104. The encoder module 94 may include and/or be implemented as an encoder that encodes received data. This may include binary convolution code (BCC) encoding. Encoded data out of the encoding module 94 is then interleaved by the interleaving module 96. The constellation mapping module 98 may include and/or be implemented as a constellation mapper that receives an output of the interleaving module 96 and performs, for example, binary phase shift keying (BPSK) modulation and tone mapping to BPSK constellation points. The replicator module 100 may repeat bits of the VHT-SIG-B field for different bandwidths, as shown in FIG. 2. The IDFT module 102 performs a frequency domain to time domain transformation on an output of the replicator module 100. The output module 104 may include filters, amplifiers, converters, etc. for transmission of OFDM signals over a channel 106 to the receiver module.

The portion 92 of the receive module includes a front end module 108, a discrete Fourier transform (DFT) module 110, a CE processing module 112, a frequency equalizer (FEQ) module 114, a constellation demapping module 116, a deinterleaving module 118, and a decoder module 120. The front end module 108 receives the OFDM signals as modified by the channel 106 and may include amplifiers, filters, converters, etc. The DFT module 110 performs a time domain to frequency domain transformation on an output of the front end module 108. The CE processing module 112 and the FEQ module 114 receive an output of the DFT module 110.

The CE processing module 112 may include a slicer-based CE module 122 and/or a decoder-based CE module 124. The slicer-based CE module 122 performs channel estimation to estimate the channel (e.g., determine a response of the channel and/or a channel matrix). This channel estimation is performed based on a VHT-SIG-B field of a receive packet and includes slicing the VHT-SIG-B field and determining the sign (+1 or −1) of each bit of the VHT-SIG-B field. This indicates whether each bit of the VHT-SIG-B field was modulated with a +1 or a −1 by the transmitter module when transmitted to the receiver module. This modulation is removed to estimate the channel. Operation of the slicer-based CE module is further described below.

The decoder-based CE module 124 performs channel estimation based on the VHT-SIG-B field of the received packet. This includes determining log-likelihood ratios, decoding the VHT-SIG-B field, repeating decoded VHT-SIG-B bits, and reencoding to determine the sign (+1 or −1) of bits of the VHT-SIG-B field. This indicates whether bits of the VHT-SIG-B field were modulated with a +1 or a −1 by the transmitter module when transmitted to the receiver module. This modulation is removed to estimate the channel. Operation of the decoder-based CE module 124 is further described below.

The CE processing module 112 provides updated channel estimations based on one or more of the channel estimates generated by the CE modules 122, 124 and/or channel estimates determined based on one or more VHT-LTFs. The updated channel estimations are provided to the FEQ module 114. The FEQ module 114 may include and/or be implemented as a frequency equalizer that equalizes the output of the DFT module 110 based on the updated channel estimations. The constellation demapping module 116 may include and/or be implemented as a constellation demapper that demodulates and demaps an output of the FEQ module 114. The demodulation may include BPSK demodulation. The deinterleaving module 118 may include and/or be implemented as a deinterleaver that deinterleaves an output of the constellation demapping module 116. The decoder module 120 decodes an output of the deinterleaving module 118. The modules 94, 96, 98, 100, 102, 104, 108, 110, 112, 114, 116, 118, 120 may operate according to IEEE 802.11ac standards.

Figure 5:
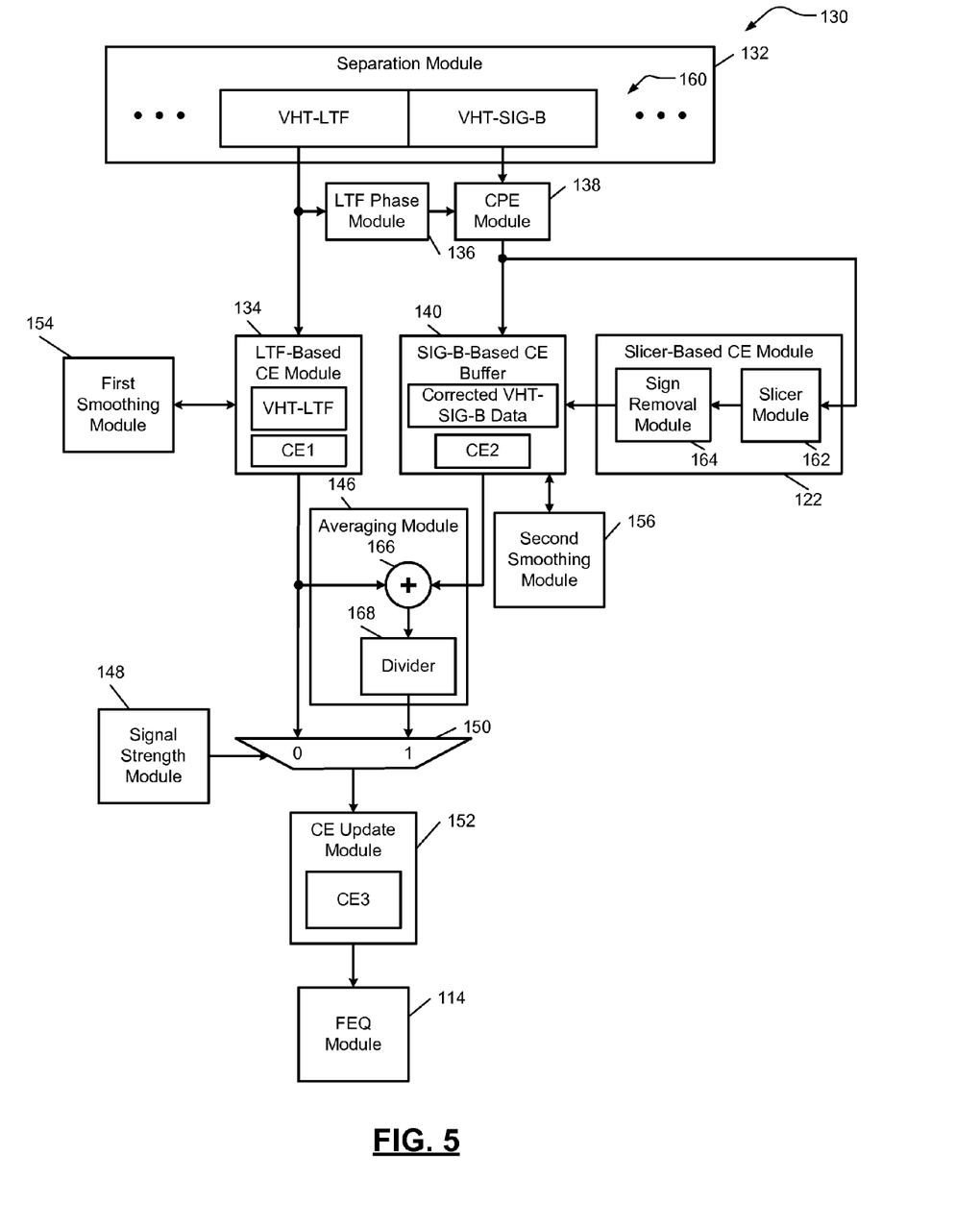
FIG. 5 is functional block diagram illustrating a portion of a channel estimation processing module in accordance with an embodiment of the present disclosure.

FIG. 5 shows a portion 130 of the CE processing module 112 and the slicer-based CE module 122 of FIG. 2. The CE processing module 112 may include a separation module 132, a LTF-based CE module 134, a LTF phase module 136, a common phase error module 138, a SIG-B-based CE buffer 140, the slicer-based CE module 122, an averaging module 146, a signal strength module 148, a multiplexer 150, and a CE update module 152. The CE processing module may also include a first smoothing module 154 and a second smoothing module 156. Operation of the modules 122, 132, 134, 136, 138, 140, 144, 146, 148, 150, 152, 154, 156 is further described with respect to FIGS. 6-7 below.

Figure 6:
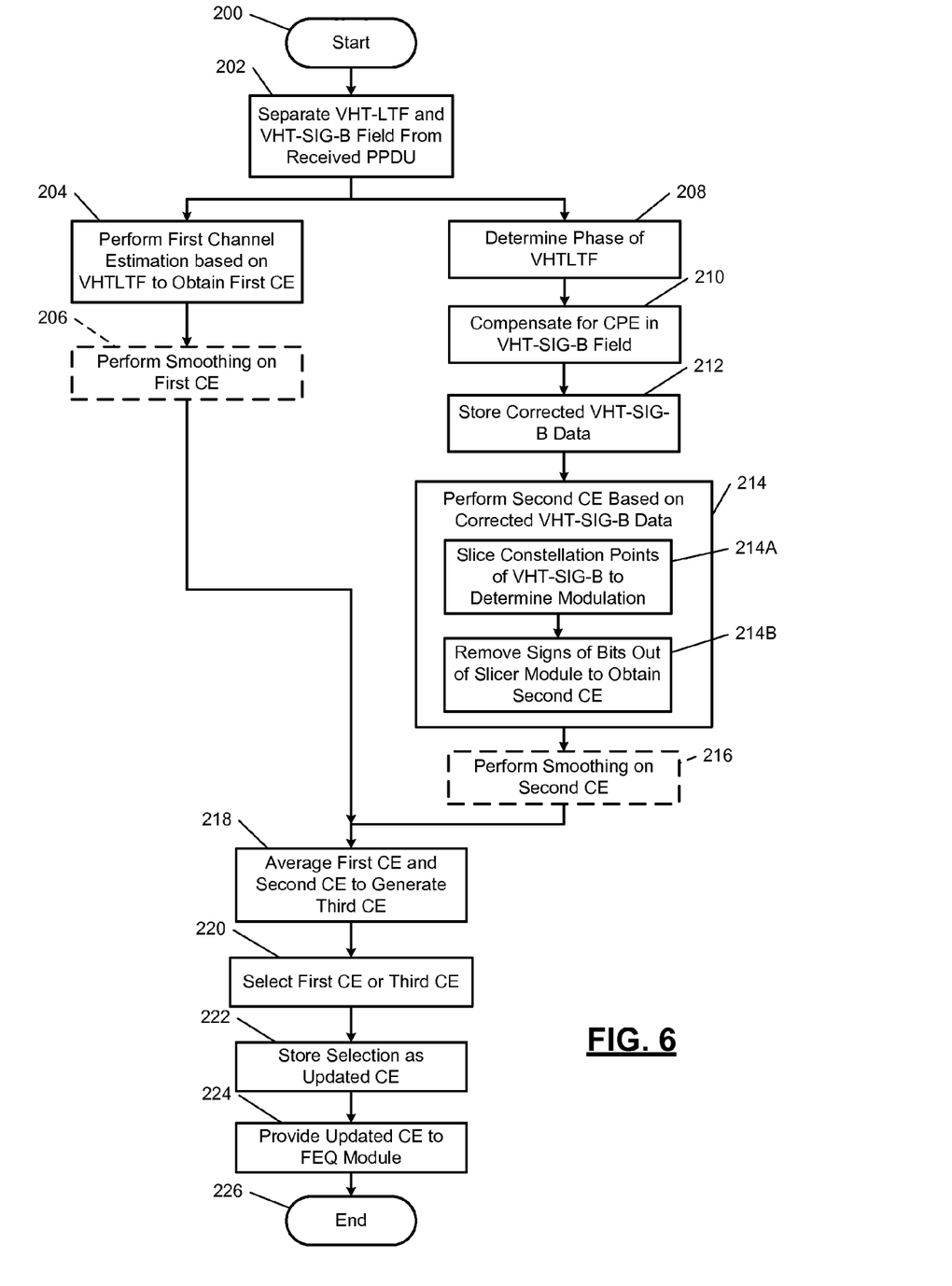
FIG. 6 illustrates a slicer-based method of operating a channel estimation module in accordance with an embodiment of the present disclosure.
Figure 10:
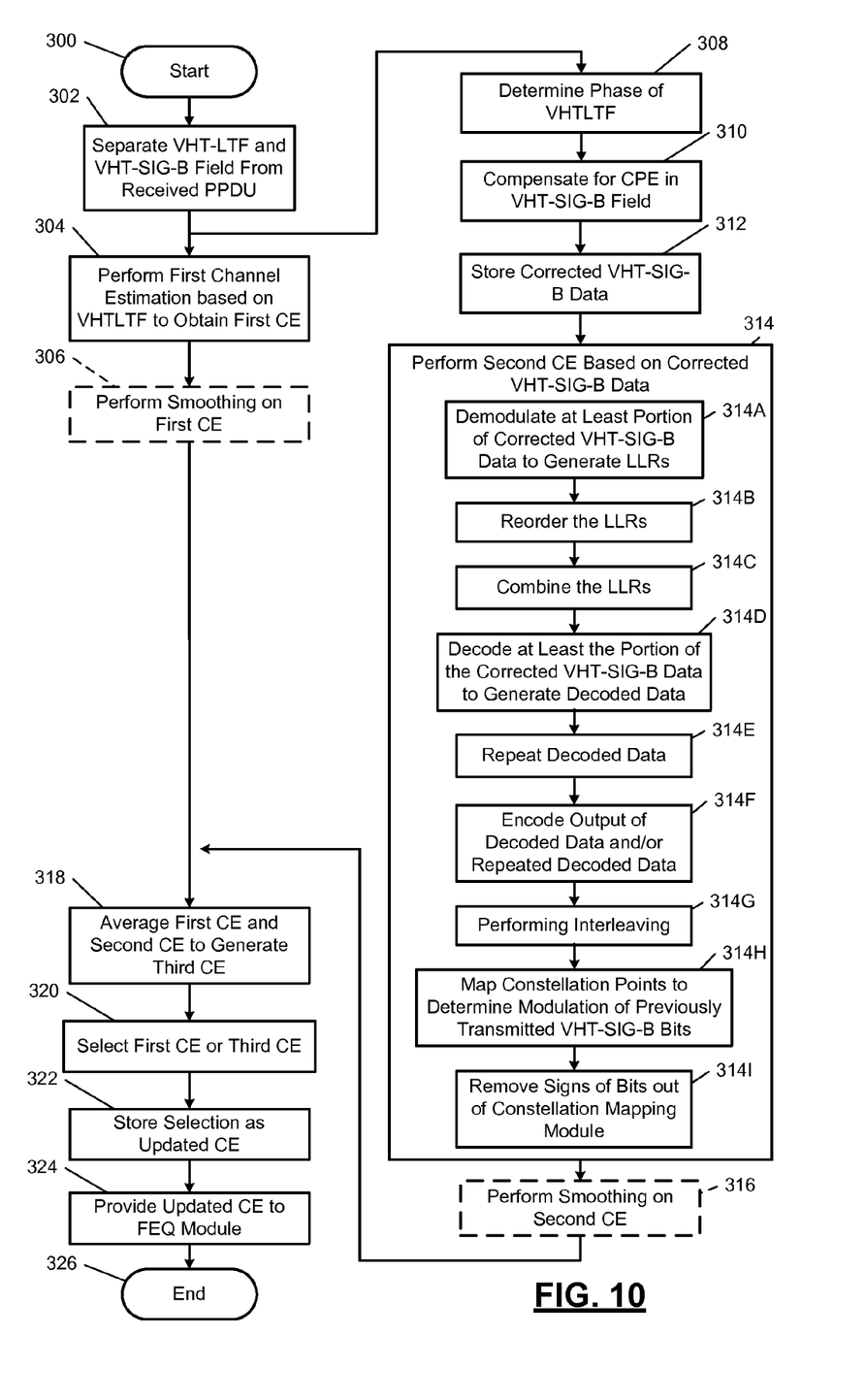
FIG. 10 illustrates a decoder-based method of operating a channel estimation module in accordance with an embodiment of the present disclosure.

The CE processing module 112 may be operated using numerous methods, example methods are illustrated in FIGS. 6 and 10. In FIG. 6, a slicer-based method of operating a channel estimation module is shown. Although the following tasks are primarily described with respect to the implementations of FIGS. 1-6, the tasks may be easily modified to apply to other implementations of the present disclosure. The tasks may be iteratively performed.

The method may begin at 200. At 202, the separation module 132 separates fields from a packet (or PPDU) transmitted from a first network device (e.g., the network device 52 of FIG. 1) and received at a second network device (e.g., the second network devices 54 of FIG. 1). A portion 160 of the packet is shown. This includes separating a VHT-LTF and a VHT-SIG-B field from the received packet and providing these fields to the LTF-based CE module 134 and the SIG-B-based CE buffer 140.

At 204, the LTF-Based CE module 134 performs a first channel estimation based on the VHT-LTF to generate a first channel estimate CE1. The first channel estimate CE1 may be stored in the LTF-based CE module 134 and generated according to IEEE 802.11ac. This may include multiplying data tones of each VHT-LTF symbol by entries of the matrix $P_{VHTLTF}$, such as entries of a first column of the matrix $P_{VHTLTF}$.

At 206, the first smoothing module 154 may perform channel smoothing on the first channel estimate CE1. This may include averaging adjacent channel estimations generated respectively for adjacent sub-carriers (or adjacent tones) of the VHT-LTF to remove noise and improve signal quality. This averaging may be performed in the frequency domain. The channel smoothing may include calculating a phase roll of adjacent tones and compensating for the phase roll. Task 206 may not be performed if the packet is a beamforming packet, as indicated by a bit in a VHT-SIG-A field of the packet.

At 208, the LTF phase module 136 determines a phase of the VHT-LTF. At 210, the CPE module 138 compensates for common phase error in the VHT-SIG-B field based on the phase of the VHT-LTF. This may include derotating phase of the VHT-SIG-B field back to the phase of the VHT-LTF to remove distortion and generate a corrected signal having corrected VHT-SIG-B data. At 212, the SIG-B-based CE buffer 140 stores the corrected VHT-SIG-B data.

At 214, the slicer-based CE module 122 performs a second channel estimation to generate a second channel estimate CE2 based on the corrected VHT-SIG-B data. The second channel estimate CE2 may be stored in the SIG-B-based CE buffer 140 and/or replace the corrected VHT-SIG-B data. The slicer-based CE module 122 includes a slicer module 162 and a sign removal module 164.

At 214A, the slicer module 162 may include and/or be implemented as a slicer that (i) receives the corrected VHT-SIG-B data, and (ii) slices constellation points of the corrected VHT-SIG-B data without decoding. The slicing is performed to determine whether each tone (i.e. sub-carrier) of the corrected VHT-SIG-B data has been previously modulated by a +1 (first predetermined value) or a −1 (second predetermined value). The slicer module 162 may determine whether a tone is modulated by a +1 or a −1 by monitoring a real part of the corrected VHT-SIG-B data signal received from the CPE module 138. This may include determining whether bits of the previously transmitted VHT-SIG-B data, as received by the second network device, have been modulated with a +1 or a −1. At 214B, the sign removal module 164 removes the signs of the bits output from the slicer module 162 to provide the second channel estimate CE2. Tasks 208, 210, 212, 214, 216 may be performed prior to, during and/or subsequent to tasks 204 and/or 206.

At 216, the second smoothing module 156 may perform channel smoothing on the second channel estimate CE2. This may include averaging adjacent channel estimations generated respectively for adjacent sub-carriers (or adjacent tones) of the VHT-SIG-B field to remove noise and improve signal quality. This averaging may be performed in the frequency domain. The smoothing of the second channel estimate CE2 may be based on the phase roll of adjacent tones calculated during smoothing of the first channel estimate CE1. The channel smoothing may include compensating for the phase roll. Task 216 may not be performed if the packet is a beamforming packet, as indicated by the bit in the VHT-SIG-A field of the packet.

At 218, the averaging module 146 may average the first channel estimate CE1 and the second channel estimate CE2 to provide a third channel estimate CE3. The averaging module 146 may include a summer 166 and a divider 168. The summer 166 may add the first channel estimate CE1 and the second channel estimate CE2. The divider 168 may divide the result of summing the first channel estimate and the second channel estimate CE2 by 2 to provide the third channel estimate CE3. The averaging may be performed in the time domain. Although tasks 206 and 216 are shown as being performed prior to task 218, the tasks 206, 216 may be performed subsequent to task 218 and prior to task 220.

At 220, the multiplexer 150 selects the first channel estimate or the third channel estimate based on an output of the signal strength module 148. The signal strength module 148 may, for example, output a 1 if a difference between a noise figure (NF) and a received signal strength indication (RSSI) is greater than a predetermined value. The second channel estimate CE2 and the third channel estimate CE3 are suitable for noise figures, RSSI values, and/or signal-to-noise ratios (and/or other values derived from the noise figures, RSSI values, signal-to-noise ratios) that are greater than corresponding first predetermined values. The signal strength module 148 may determine the NF and/or RSSI based on one or more fields in the preamble of the received packet. For example, if NF−RSSI is greater than the first predetermined threshold, the multiplexer 150 selects the third channel estimate CE3 provided by the averaging module 146. This difference is an indication of a signal-to-noise ratio (SNR). If NF−RSSI is less than or equal to the first predetermined threshold, then the signal strength module 148 outputs a 0 and the multiplexer 150 selects the first channel estimate CE1.

At 222, an output of the multiplexer 150 is provided to the CE update module 152 and is stored as the updated channel estimate. At 224, the updated channel estimate is provided to the FEQ module 114 for frequency equalization, as described above with respect to FIG. 1. The method may end at 226.

Figure 7:
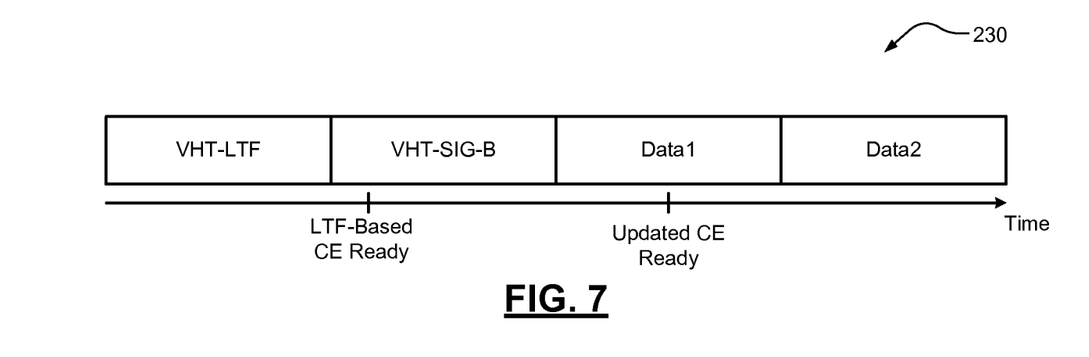
FIG. 7 is a block diagram illustrating a timing schedule for a slicer-based example in accordance with an embodiment of the present disclosure.

FIG. 7 shows a timing schedule 230 for a slicer-based example and corresponds to the method of FIG. 6. The timing schedule 230 illustrates that the VHT-LTF is received followed by the VHT-SIG-B field. Tasks 204 and/or 206 are performed, such that the first channel estimate CE1 is available during reception of the VHT-SIG-B field. The updated channel estimate as provided to the CE update module 152 is available during reception of a first data symbol Data1 of the received packet. This allows each of the data symbols of the received packet to be demodulated and decoded based on the updated channel estimate. The channel estimate stored in the CE update module 152 may be updated once and used for demodulating and decoding each of the data symbols in the received packet.

Figure 8:
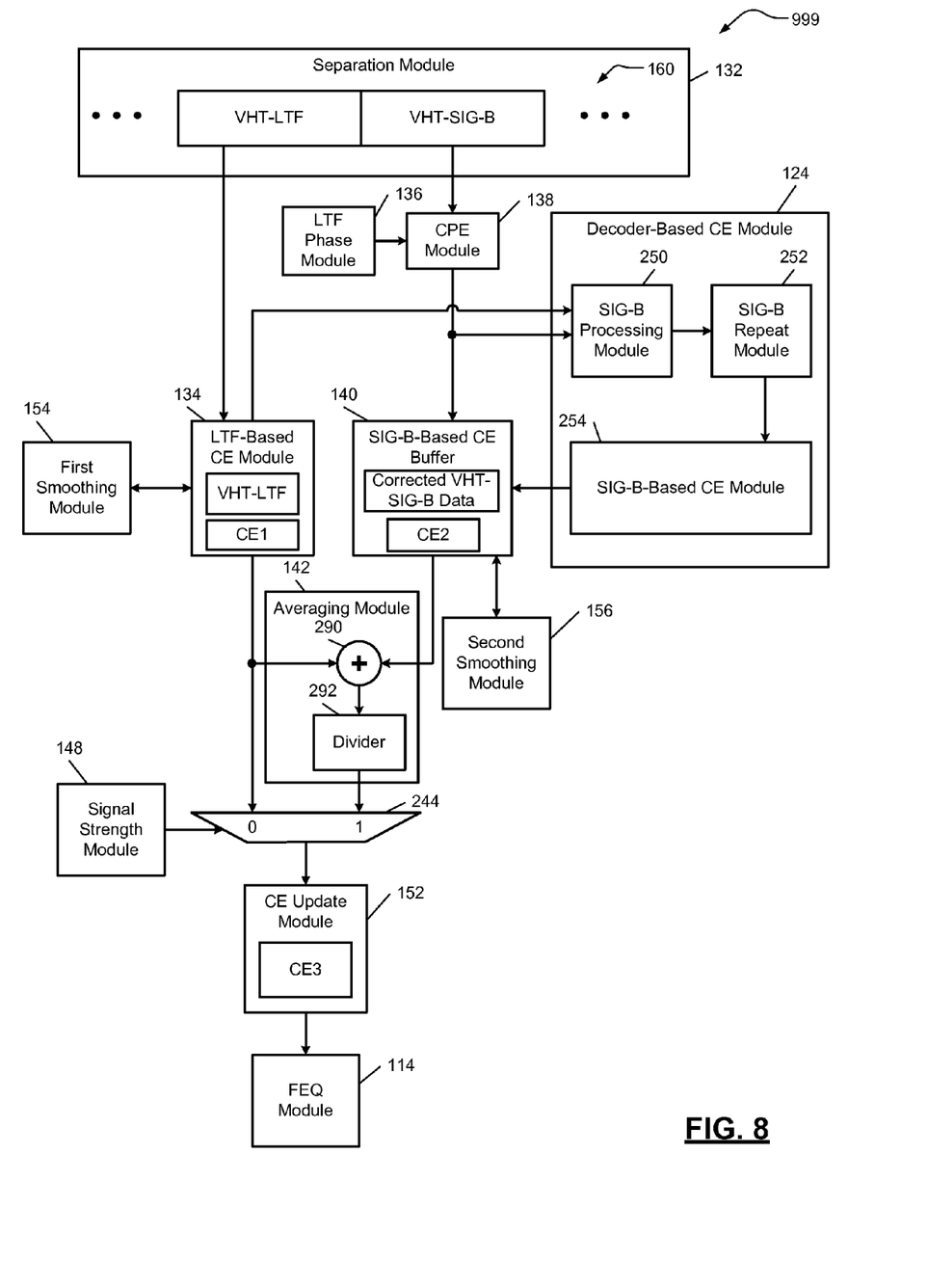
FIG. 8 is a function block diagram of another portion of the channel estimation processing module in accordance with an embodiment of the present disclosure.
Figure 9:
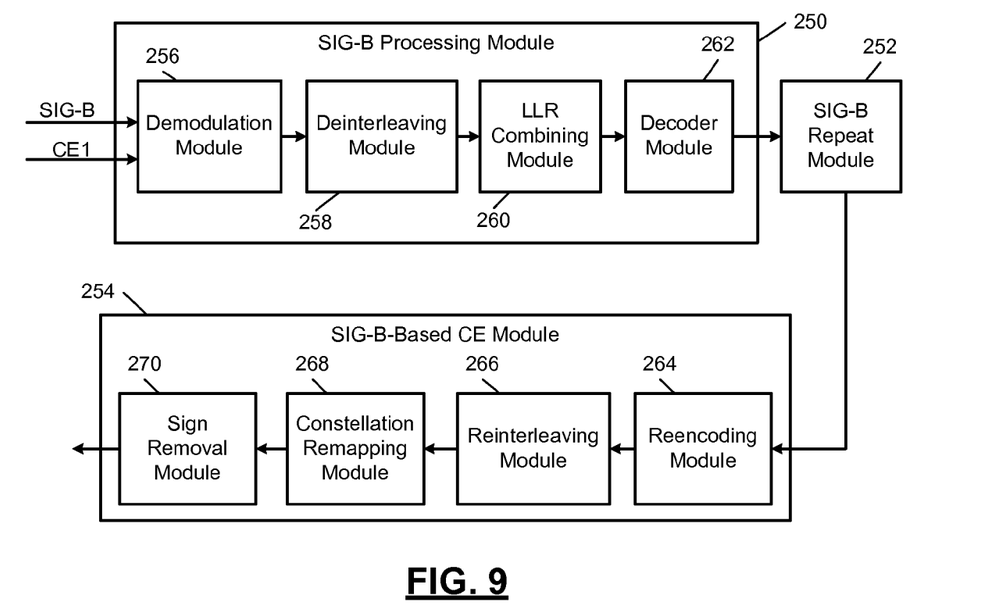
FIG. 9 is a functional block diagram of a decoder-based channel estimation module in accordance with an embodiment of the present disclosure.

FIGS. 8 and 9 show another portion 240 of the CE processing module 112 and the decoder-based CE module 124 of FIG. 2. The portion 240 includes the separation module 132, the LTF-based CE module 134, the LTF phase module 136, the CPE module 138, the SIG-B-based CE buffer 140, the decoder-based CE module 124, an averaging module 242, a multiplexer 244, the signal strength module 148, and the CE update module 152. The portion 240 may also include the first smoothing module 154 and the second smoothing module 156. The decoder-based CE module 124 includes a SIG-B processing module 250, a SIG-B repeat module 252, and a SIG-B-based CE module 254. The SIG-B processing module 250 includes a demodulation module 256, a deinterleaving module 258, a LLR combining module 260, and a decoder module 262. The SIG-B-based CE module 254 includes a reencoding module 264, a reinterleaving module 266, a constellation remapping module 268 and a sign removal module 270. Operation of the modules 132, 134, 136, 138, 140, 152, 154, 156, 242, 250, 252, 254 is further described with respect to FIGS. 10-11 below.

In FIG. 10, a decoder-based method of operating a channel estimation module is shown. Although the following tasks are primarily described with respect to the implementations of FIGS. 1-4 and 8-9, the tasks may be easily modified to apply to other implementations of the present disclosure. The tasks may be iteratively performed. Some or all of the tasks may be performed in replacement of, in addition to, and/or in parallel with the tasks of the method of FIG. 6.

The method may begin at 300. At 302, the separation module 132 separates fields from a packet (or PPDU) transmitted from a first network device (e.g., the network device 52 of FIG. 1) and received at a second network device (e.g., the second network devices 54 of FIG. 1). A portion 280 of the packet is shown. This may be the same packet received at 202 or may be a different packet. This includes separating a VHT-LTF and a VHT-SIG-B field from the received packet and providing these fields to the LTF-based CE module 134 and the SIG-B-based CE buffer 140.

At 304, the LTF-Based CE module 134 performs a first channel estimation based on the VHT-LTF to generate a first channel estimate CE1. The channel estimate CE1 may be stored in the LTF-based CE module 134. The first channel estimate CE1 may be generated according to IEEE 802.11ac. This may include multiplying data tones of each VHT-LTF symbol by entries of the matrix $P_{VHTLTF}$, such as entries of a first column of the matrix $P_{VHTLTF}$.

At 306, the first smoothing module 154 may perform channel smoothing. This may include averaging adjacent channel estimations generated respectively for adjacent sub-carriers (or adjacent tones) of the VHT-LTF to remove noise and improve signal quality. This averaging may be performed in the frequency domain. The channel smoothing may include calculating a phase roll of adjacent tones and compensating for the phase roll. Task 306 may not be performed if the packet is a beamforming packet, as indicated by a bit in a VHT-SIG-A field of the packet.

At 308, the LTF phase module 136 determines a phase of the VHT-LTF. At 310, the CPE module 138 compensates for common phase error based on the phase of the VHT-LTF. This may include derotating phase of the VHT-SIG-B field back to the phase of the VHT-LTF to remove distortion to generate corrected signal having corrected VHT-SIG-B data.

At 312, the SIG-B-based CE buffer 140 stores the corrected VHT-SIG-B data. At 314, the decoder-based CE module 124 performs a second channel estimation to generate a second channel estimate CE2 based on the corrected VHT-SIG-B data. The second channel estimate CE2 may be stored in the SIG-B-based CE buffer 140 and/or replace the corrected VHT-SIG-B data.

At 314A, the demodulation module 256 may include and/or be implemented as a demodulator that (i) receives the corrected VHT-SIG-B data and the first channel estimate CE1, and (ii) demodulates at least a first portion or set of data in the corrected VHT-SIG-B data based on the first channel estimate CE1. The corrected VHT-SIG-B data may include multiple sets of data. Depending on the corresponding bandwidth, the first set of data may have been repeated one or more times to provide the other sets of data. The demodulation module 256 may demodulate only the first set of data. This may include constellation demapping and removal of a channel effects on sub-carriers of raw received VHT-SIG-B data. This may further include estimating LLRs respectively for bits of the first set of data. Examples of repeated SIG-B data are shown in FIG. 2. LLRs may be determined respectively for bits of the other sets of data. At 314B, the deinterleaving module 258 may include and/or be implemented as a deinterleaver that reorders the LLRs for the first set of data and/or for the other sets of data.

At 314C, the LLR combining module 260 combines the LLRs for the first set of data and/or for the other sets of data. This may include averaging the LLRs for the first set of data and/or for the other sets of data to provide a single LLR or concatenating the LLRs for the first set of data and/or for the other sets of data. In another embodiment, the combining includes combining LLRs corresponding to each of the sets of data to provide respective LLRs for the sets of data. At 314D, the decoder module 262 may include and/or be implemented as a decoder that decodes the first set of data based on an output of the LLR combining module 260 to derive original information bits. In one embodiment, a single LLR determined for the first set of data is used to decode the first set of data. In another embodiment, LLRs determined for each of the sets of data are used to decode the first set of data. The decoder module 262 may decode only the first set of data or may decode, in addition to the first set of data, one or more of the other sets of data.

At 314E, the SIG-B repeat module 252 may repeat the decoded VHT-SIG-B data provided by the decoder module 262 one or more times depending on the bandwidth. Task 314E may not be performed if the decoder module 262 decodes all of the sets of data.

At 314F, the reencoding module 264 may include and/or be implemented as an encoder that encodes an output of the decoder module 262 or the SIG-B repeat module 252. This may include BCC encoding. At 314G, the reinterleaving module 266 may include and/or be implemented as an interleaver that interleaves an output of the reencoding module 264. At 314H, the constellation remapping module 268 may include and/or be implemented as a constellation mapper that maps constellation points of an output of the reinterleaving module 266 to determine whether each tone (i.e. sub-carrier) of the corrected VHT-SIG-B data has been previously modulated by a +1 or a −1 based on an output of the LLR combining module 260. This may include determining whether bits of the VHT-SIG-B data, as received at the second network device, have been modulated with a +1 or a −1. At 314I, the sign removal module 270 removes the sign of bits out of the constellation remapping module 268 to provide the second channel estimate CE2.

At 316, the second smoothing module 156 may perform channel smoothing. This may include averaging adjacent channel estimations generated respectively for adjacent sub-carriers (or adjacent tones) of the VHT-SIG-B field to remove noise and improve signal quality. This averaging may be performed in the frequency domain. The smoothing of the second channel estimate CE2 may be based on the phase roll of adjacent tones calculated during smoothing of the first channel estimate CE1 at 306. The channel smoothing may include compensating for the phase roll. Task 316 may not be performed if the packet is a beamforming packet, as indicated by the bit in the VHT-SIG-A field of the packet.

At 318, the averaging module 242 may average the first channel estimate CE1 and the second channel estimate CE2 to provide a third channel estimate CE3. The averaging module 242 may include a summer 290 and a divider 292. The summer 290 may add the first channel estimate CE1 and the second channel estimate CE2. The divider 292 may divide the result of summing the first channel estimate and the second channel estimate CE2 by 2 to provide the third channel estimate CE3. The averaging may be performed in the time domain. Although tasks 306 and 316 are shown as being performed prior to task 318, the tasks 306, 316 may be performed subsequent to task 318 and prior to task 320.

At 320, the multiplexer 244 selects the first channel estimate or the third channel estimate based on an output of the signal strength module 148, as similarly described above with respect to task 220 except the threshold value may be different. The second channel estimate CE2 and the third channel estimate CE3 are suitable for signal noise values, RSSI values, and/or signal-to-noise ratios (and/or other values derived from the signal noise values, RSSI values, signal-to-noise ratios) that are greater than corresponding second predetermined values. The second predetermined values may be less than the first predetermined values. The signal strength module 148 may determine a NF and/or RSSI based on one or more fields in the preamble of the received packet. For example, if NF−RSSI is greater than the second predetermined threshold, the signal strength module 148 outputs a 1 and the multiplexer 150 selects the third channel estimate CE3 provided by the averaging module 242. This difference is an indication of a signal-to-noise ratio (SNR). If NF−RSSI is less than or equal to the first predetermined threshold, then the signal strength module 148 outputs a 0 and the multiplexer 244 selects the first channel estimate.

At 322, an output of the multiplexer 244 is provided to the CE update module 152 and is stored as the updated channel estimate. At 324, the updated channel estimate is provided to the FEQ module 114, as described above with respect to FIG. 1. The method may end at 326.

Figure 11:
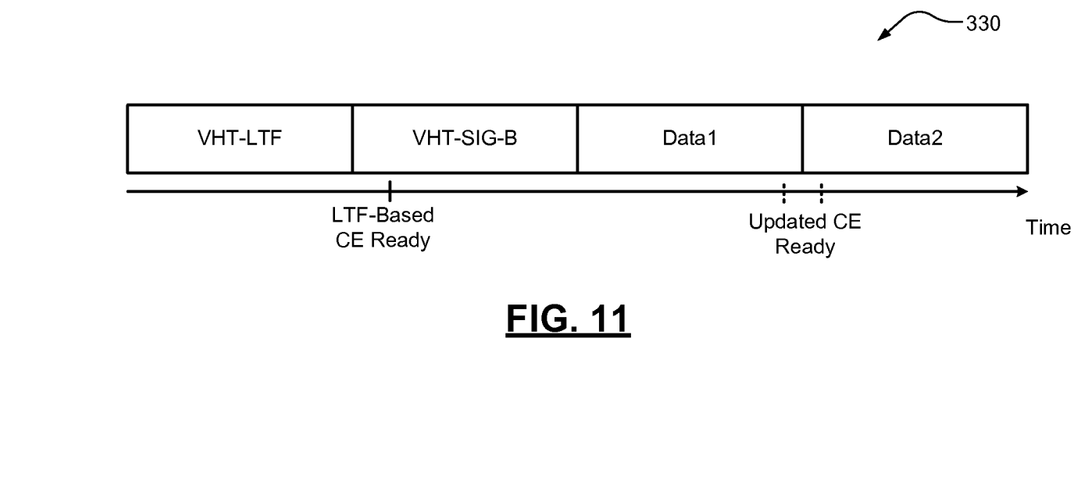
FIG. 11 is a block diagram illustrating a timing schedule for a decoder-based example in accordance with an embodiment of the present disclosure.

FIG. 11 shows a timing schedule 330 for a decoder-based example and corresponds to the method of FIG. 10. The timing schedule illustrates that the VHT-LTF is received followed by the VHT-SIG-B field. Tasks 304 and/or 306 are performed, such that the first channel estimate CE1 is available during reception of the VHT-SIG-B field. The updated channel estimate, as provided to the CE update module 152, may be available during reception of a first data symbol Data1 of the received packet or a second data symbol Data2. If the updated channel estimate is provided during reception of the first data symbol Data1, then the first channel estimate CE1, the second channel estimate CE2, and/or the third channel estimate CE3 may be used to demodulate and decode each of the data symbols Data1, Data2, etc. If the updated channel estimate is provided during reception of the second data symbol Data2, then: the first channel estimate CE1 may be used to demodulate and decode the first data symbol Data1; and the second channel estimate CE2 and the third channel estimate CE3 may not be used to demodulate and decode the first data symbol Data1. As an alternative, if the updated channel estimate is provided during reception of the second data symbol Data2, then the FEQ module may delay demodulating and decoding of the first data symbol Data 1 to allow demodulating and decoding of the first data symbol Data1 based on the second channel estimate CE2 and/or the third channel estimate CE3. If the updated channel estimate is provided during reception of the second data symbol Data2, then each of the data symbols Data2, Data3, etc. received subsequent to the first data symbol Data1 may be demodulated and decoded based on the second channel estimate CE2 and/or the third channel estimate CE3.

In one embodiment, if the updated channel estimate is provided using the method of FIG. 10 is not provided during reception of the first data symbol Data1 of a received packet, then the updated channel estimate provided using the method of FIG. 6 may be used to demodulate and decode the first data symbol Data1. The updated channel estimate provided using the method of FIG. 10 may then be used to demodulate and decode the remaining data symbols Data2, Data3, etc. of the received packet.

The above-described tasks of FIGS. 6 and 10 are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

The above-described averaging of channel estimates (described with respect to FIGS. 6 and 10 and referred to as channel estimate combining) may be performed for a single space-time stream (STS) packet for a single user (SU) or may be performed for multiple STS packets to estimate a MIMO channel. In multiple STS packets implementations, the channel estimate (e.g., CE2) determined based on a VHT-SIG-B field may be averaged with the channel estimate (e.g., CE1) determined based on a VHT-LTF to improve MIMO channel estimation. The averaged channel estimate (e.g., CE3) may be a result of the MIMO channel estimation.

The slicer-based method of FIG. 6 may be used for SNR values greater than a first predetermined threshold. The decoder-based method of FIG. 10 may be used for SNR values greater than a second predetermined threshold. The second predetermined threshold may be less than the first predetermined threshold. This is because for the decoder-based method: there is a low chance that decoding of a VHT-SIG-A field (has 2 symbols) passes and a decoding of a corresponding VHT-SIG-B field (having 1 symbol) fails; and there is a low chance the decoding of the VHT-SIG-B field fails, and decoding of corresponding data symbols is correct. In addition, the decoder based method: provides channel estimations based on LLR combining for VHT-SIG-B fields having repeated sets of data, such as in the 40 MHz and 80 MHz bandwidth implementations; and experiences larger performance gains at low SNRs than the slicer-based method.

The above-described examples include performing channel estimations based on VHT-SIG-B fields. Since the VHT-SIG-B fields are modulated similar to VHT-LTFs, the VHT-SIG-B fields may be used as additional VHT-LTFs by averaging the channel estimations determined based on the VHT-SIG-B fields with channel estimations determined based on the VHT-LTFs. The averaged channel estimations may then be used as updated channel estimations for improved frequency equalization and decoding. This in turn improves packet error rates. These improvements are provided with or without performing channel smoothing.

The wireless communications described in the present disclosure can be conducted in full or partial compliance with IEEE standard 802.11-2012. In various implementations, IEEE 802.11-2012 may be supplemented by draft IEEE standard 802.11ac.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium include nonvolatile memory circuits (such as a flash memory circuit or a mask read-only memory circuit), volatile memory circuits (such as a static random access memory circuit and a dynamic random access memory circuit), and secondary storage, such as magnetic storage (such as magnetic tape or hard disk drive) and optical storage.

The apparatuses and methods described in this application may be partially or fully implemented by a special purpose computer created by configuring a general purpose computer to execute one or more particular functions embodied in computer programs. The computer programs include processor-executable instructions that are stored on at least one non-transitory, tangible computer-readable medium. The computer programs may also include or rely on stored data. The computer programs may include a basic input/output system (BIOS) that interacts with hardware of the special purpose computer, device drivers that interact with particular devices of the special purpose computer, one or more operating systems, user applications, background services and applications, etc.

The computer programs may include: (i) assembly code; (ii) object code generated from source code by a compiler; (iii) source code for execution by an interpreter; (iv) source code for compilation and execution by a just-in-time compiler, (v) descriptive text for parsing, such as HTML (hypertext markup language) or XML (extensible markup language), etc. As examples only, source code may be written in C, C++, C#, Objective-C, Haskell, Go, SQL, Lisp, Java®, ASP, Perl, Javascript®, HTML5, Ada, ASP (active server pages), Perl, Scala, Erlang, Smalltalk, Ruby, Flash®, Visual Basic®, Lua, or Python®.

None of the elements recited in the claims is intended to be a means-plus-function element within the meaning of 35 U.S.C. §112(f) unless an element is expressly recited using the phrase "means for", or in the case of a method claim using the phrases "operation for" or "step for".

What is claimed is:

1. A network device comprising:
a receiver module configured to receive a packet wirelessly transmitted over a channel to the network device, wherein the packet comprises a signal field, and wherein the signal field (i) comprises a plurality of bits, or (ii) has a corresponding plurality of sub-carriers;
a first channel estimate module configured to, (i) based on the signal field, perform a plurality of determinations, wherein each of the plurality of determinations indicates whether a respective one of the plurality of bits or a respective one of the plurality of sub-carriers has been modulated with a first predetermined value or a second predetermined value, and (ii) based on the plurality of determinations, output a first channel estimate of the channel; and
a frequency equalizer configured to (i) receive a first signal comprising the packet, and (ii) equalize the first signal based on the first channel estimate.

2. The network device of claim 1, wherein:
the packet comprises legacy fields and high throughput fields;
the high throughput fields include the signal field; and
the signal field indicates a length of data in the packet or a type of modulation and coding method of the packet.

3. The network device of claim 1, wherein:
the first channel estimate module comprises a slicer module; and
the slicer module is configured to slice constellation points of the signal field to determine (i) which of the plurality of bits or which of the plurality of sub-carriers has been modulated with the first predetermined value, and (ii) which of the plurality of bits or which of the plurality of sub-carriers has been modulated with the second predetermined value.

4. The network device of claim 3, further comprising a common phase error module configured to correct a common phase error of the signal field to generate a corrected signal, wherein:
the slicer module is configured to (i) monitor a real part of the corrected signal, and (ii) based on the real part of the corrected signal, determine (a) which of the plurality of sub-carriers has been modulated with the first predetermined value, and (b) which of the plurality of sub-carriers has been modulated with the second predetermined value;
the first predetermined value is a +1; and
the second predetermined value is a −1.

5. The network device of claim 3, further comprising:
a second channel estimation module configured to generate a second estimate of the channel based on a training field, wherein the packet comprises the training field;
an averaging module configured to generate a third estimate of the channel based on an average of the first estimate of the channel and the second estimate of the channel; and
a multiplexer configured to select the second estimate of the channel or the third estimate of the channel,
wherein the frequency equalizer is configured to equalize the first signal based on the third estimate of the channel.

6. The network device of claim 5, wherein the multiplexer is configured to select the second estimate of the channel or the third estimate of the channel based on whether a signal strength value is greater than a predetermined threshold.

7. The network device of claim 1, further comprising a smoothing module configured to perform channel smoothing on the first estimate of the channel,
wherein the frequency equalizer is configured to equalize the first signal based on a result of the channel smoothing.

8. The network device of claim 1, further comprising:
a second channel estimation module configured to generate a second estimate of the channel based on a training field, wherein the packet comprises the training field;
an averaging module configured to generate a third estimate of the channel based on an average of the first estimate of the channel and the second estimate of the channel; and
a multiplexer configured to select the second estimate of the channel or the third estimate of the channel,
wherein the frequency equalizer is configured to equalize the first signal based on the third estimate of the channel.

9. The network device of claim 8, further comprising:
a first smoothing module configured to perform channel smoothing on the first estimate of the channel; and
a second smoothing module configured to perform channel smoothing on the second estimate of the channel,
wherein
the averaging module is configured to generate the third estimate of the channel based on (i) a result of channel smoothing the first estimate of the channel, and (ii) a result of smoothing the second estimate of the channel, and
the frequency equalizer is configured to equalize the first signal based on the result of smoothing the second estimate of the channel.

10. The network device of claim 1, further comprising a second channel estimate module configured to generate a second estimate of the channel based on a training field, wherein:
the packet comprises the training field; and
the first channel estimate module is configured to (i) generate a log likelihood ratio based on the signal field and the second estimate of the channel, (ii) decode data of the signal field based on the log likelihood ratio, and (iii) encode the data of the signal field to determine (a) which of the plurality of bits or which of the plurality of sub-carriers has been modulated with the first predetermined value, and (b) which of the plurality of bits or which of the plurality of sub-carriers has been modulated with the second predetermined value.

11. The network device of claim 10, further comprising:
an averaging module configured to generate a third estimate of the channel based on an average of the first estimate of the channel and the second estimate of the channel; and
a multiplexer configured to select the second estimate of the channel or the third estimate of the channel,
wherein the frequency equalizer is configured to equalize the first signal based on the third estimate of the channel.

12. The network device of claim 11, wherein the multiplexer is configured to select the second estimate of the channel or the third estimate of the channel based on whether a signal strength value is greater than a predetermined threshold.

13. A method comprising:
receiving a packet wirelessly transmitted over a channel at a network device, wherein the packet comprises a signal field, and wherein the signal field (i) comprises a plurality of bits, and (ii) has a corresponding plurality of sub-carriers;
based on the signal field, performing a plurality of determinations, wherein each of the plurality of determinations indicates whether a respective one of the plurality of bits or a respective one of the plurality of sub-carriers has been modulated with a first predetermined value or a second predetermined value, and (ii) based on the plurality of determinations, output a first channel estimate of the channel;
receiving a first signal comprising the packet at a frequency equalizer; and
equalizing, via the frequency equalizer, the first signal based on the first estimate of the channel.

14. The method of claim 13, further comprising slicing constellation points of the signal field to determine (i) which of the plurality of bits or which of the plurality of sub-carriers has been modulated with the first predetermined value, and (ii) which of the plurality of bits or which of the plurality of sub-carriers has been modulated with the second predetermined value.

15. The method of claim 14, further comprising:
correcting a common phase error of the signal field to generate a corrected signal;
monitoring a real part of the corrected signal; and
based on the real part of the corrected signal, determining (a) which of the plurality of sub-carriers has been modulated with the first predetermined value, and (b) which of the plurality of sub-carriers has been modulated with the second predetermined value,
wherein
the first predetermined value is a +1, and
the second predetermined value is a −1.

16. The method of claim 14, further comprising:
generating a second estimate of the channel based on a training field, wherein the packet comprises the training field;
averaging the first estimate of the channel and the second estimate of the channel to generate a third estimate of the channel; and
selecting the second estimate of the channel or the third estimate of the channel,
wherein the equalizing of the first signal is based on the third estimate of the channel.

17. The method of claim 13, further comprising performing channel smoothing on the first estimate of the channel,
wherein the equalizing of the first signal is based on a result of the channel smoothing.

18. The method of claim 13, further comprising:
generating a second estimate of the channel based on a training field, wherein the packet comprises the training field;
averaging the first estimate of the channel and the second estimate of the channel to generate a third estimate of the channel; and
selecting the second estimate of the channel or the third estimate of the channel,
wherein the equalizing of the first signal is based on the third estimate of the channel.

19. The method of claim 18, further comprising:
performing channel smoothing on the first estimate of the channel; and
performing channel smoothing on the second estimate of the channel,
wherein
the third estimate of the channel is generated based on (i) a result of channel smoothing the first estimate of the channel, and (ii) a result of smoothing the second estimate of the channel, and
the equalizing of the first signal is based on the result of smoothing the second estimate of the channel.

20. The method of claim 13, further comprising:
generating a second estimate of the channel based on a training field,
wherein the packet comprises the training field;
generating a log likelihood ratio based on the signal field and the second estimate of the channel;
decoding data of the signal field based on the log likelihood ratio; and
encoding the data of the signal field to determine (a) which of the plurality of bits or which of the plurality of sub-carriers has been modulated with the first predetermined value, and (b) which of the plurality of bits or which of the plurality of sub-carriers has been modulated with the second predetermined value.

21. The method of claim 20, further comprising:
averaging the first estimate of the channel and the second estimate of the channel to generate a third estimate of the channel; and
selecting the second estimate of the channel or the third estimate of the channel,
wherein the equalizing of the first signal is based on the third estimate of the channel.

* * * * *